United States Patent
Otomaru

(10) Patent No.: US 10,911,640 B2
(45) Date of Patent: Feb. 2, 2021

(54) IMAGE READING APPARATUS AND IMAGE READING METHOD

(71) Applicant: SEIKO EPSON CORPORATION, Tokyo (JP)

(72) Inventor: Soichi Otomaru, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/725,415

(22) Filed: Dec. 23, 2019

(65) Prior Publication Data
US 2020/0213474 A1   Jul. 2, 2020

(30) Foreign Application Priority Data
Dec. 26, 2018   (JP) ................................ 2018-242248

(51) Int. Cl.
  *H04N 1/60*     (2006.01)
  *H04N 1/04*     (2006.01)
  *H04N 1/00*     (2006.01)
  *H04N 1/401*    (2006.01)

(52) U.S. Cl.
  CPC ........... *H04N 1/60* (2013.01); *H04N 1/00814* (2013.01); *H04N 1/00978* (2013.01); *H04N 1/04* (2013.01); *H04N 1/401* (2013.01)

(58) Field of Classification Search
None
See application file for complete search history.

(56) References Cited

U.S. PATENT DOCUMENTS

| | | | | |
|---|---|---|---|---|
| 2003/0072497 A1* | 4/2003 | Hiromatsu | ............. | H04N 1/401 382/274 |
| 2009/0122363 A1* | 5/2009 | Yamazaki | ............ | H04N 1/1017 358/475 |
| 2010/0302605 A1* | 12/2010 | Suzuki | ............... | H04N 1/00002 358/474 |
| 2012/0013955 A1* | 1/2012 | Ikeda | ..................... | H04N 1/203 358/461 |
| 2013/0044338 A1* | 2/2013 | Nikaku | ............. | H04N 1/00045 358/1.13 |

(Continued)

FOREIGN PATENT DOCUMENTS

| | | |
|---|---|---|
| JP | H10-257314 | 9/1998 |
| JP | 2011097528 A * | 5/2011 |

(Continued)

*Primary Examiner* — Ted W Barnes
(74) *Attorney, Agent, or Firm* — Workman Nydegger

(57) ABSTRACT

The controller of the image reading apparatus acquires second reference data indicating a reading value of a background plate by causing the reading unit to read the background plate during a non-document-reading period between a document-reading period and a document-reading period, calculates a first difference indicating a difference between a value in a first pixel range corresponding to an element group, among the plurality of photoelectric conversion elements, in a range under temperature influence by a given heat generation source and a value in a second pixel range, that is, part of a pixel range which does not fall under the first pixel range with respect to the second reference data, and updates, when the first difference exceeds a first allowable value, the first reference data by correcting a value in the first pixel range of the first reference data based on the first difference.

5 Claims, 7 Drawing Sheets

(56) References Cited

U.S. PATENT DOCUMENTS

| | | | |
|---|---|---|---|
| 2013/0194638 A1* | 8/2013 | Kuno | H04N 1/00045 |
| | | | 358/406 |
| 2017/0034364 A1* | 2/2017 | Matsumi | H04N 1/00013 |
| 2017/0134613 A1* | 5/2017 | Matsubara | H04N 1/00082 |
| 2017/0214827 A1* | 7/2017 | Sasaki | H04N 1/00045 |
| 2017/0353618 A1* | 12/2017 | Fusayasu | G06T 5/008 |
| 2019/0007573 A1* | 1/2019 | Kikuchi | H04N 1/00835 |
| 2019/0320089 A1* | 10/2019 | Yoshizawa | H04N 1/024 |

FOREIGN PATENT DOCUMENTS

| | | |
|---|---|---|
| JP | 2013-150130 | 8/2013 |
| JP | 2018-074516 | 5/2018 |

* cited by examiner

S270 "Yes"

S274 "Yes"

IMAGE READING APPARATUS AND IMAGE READING METHOD

The present application is based on, and claims priority from JP Application Serial Number 2018-242248, filed Dec. 26, 2018, the disclosure of which is hereby incorporated by reference herein in its entirety.

BACKGROUND

1. Technical Field

The present disclosure relates to an image reading apparatus and an image reading method.

2. Related Art

An image forming system is known in which a reading unit that is provided downstream of an image forming unit in the transport direction and that reads an image on a sheet formed by the image forming unit, a temperature sensor that detects the temperature of the reading unit, a calibration unit that calibrates the reading unit, a storage unit that stores temperature characteristics, indicating a variation amount of a color change, of the reading unit with respect to a temperature change amount of the reading unit, and a controller that determines timing for performing calibration of the reading unit by the calibration unit based on the temperature characteristics and the temperature change amount of the reading unit during performance of the consecutive print job (shading correction using a reference plate) (see JP-A-2018-74516).

The output characteristics of each of the plurality of photoelectric conversion elements included in the reading unit of the scanner vary under the influence of a change in the ambient temperature and the like. The shading correction is performed to correct such variations in output characteristics of the respective elements. The shading correction is performed after updating the value, for each pixel, of the reference data used for the shading correction in accordance with the current output characteristics of the respective elements. However, when values of the reference data for all the pixels are updated according to the output characteristics of the respective elements whenever the shading correction is performed, the waiting time between a time of reading one document and a time of reading the next document is increased in the process of consecutive scanning in which a plurality of documents is consecutively read, so that there is a problem that the speed of consecutive scanning is reduced. Therefore, improvement for reducing the burden of the update has been demanded.

SUMMARY

According to an aspect of the present disclosure, an image reading apparatus includes a transport unit configured to consecutively transport a plurality of documents, a light source that irradiates the documents transported by the transport unit, a reading unit having a plurality of photoelectric conversion elements arranged in a direction intersecting a direction in which the document is transported by the transport unit and reading the document transported by the transport unit, and a controller that performs shading correction on image data that is a reading value of the documents read by the reading unit based on first reference data indicating a reference value for the shading correction, wherein the controller acquires second reference data indicating a reading value of a background plate by causing the reading unit to read the background plate during a non-document-reading period between a document-reading period and a document-reading period where the reading unit reads the document during the document-reading period, calculates a first difference indicating a difference between a value in a first pixel range corresponding to an element group, among the plurality of photoelectric conversion elements, in a range under temperature influence by a given heat generation source and a value in a second pixel range, that is, part of a pixel range which does not fall under the first pixel range with respect to the second reference data, and updates, when the first difference exceeds a first allowable value, the first reference data by correcting a value in the first pixel range of the first reference data based on the first difference.

DESCRIPTION OF EXEMPLARY EMBODIMENTS

Hereinafter, embodiments of the present disclosure will be described with reference to the drawings. The drawings are only an example for describing the embodiments. Since the drawings are an illustration, they may not be in agreement with each other, or may be partially omitted.

1. Schematic Configuration of Image Reading Apparatus

Figure 1:
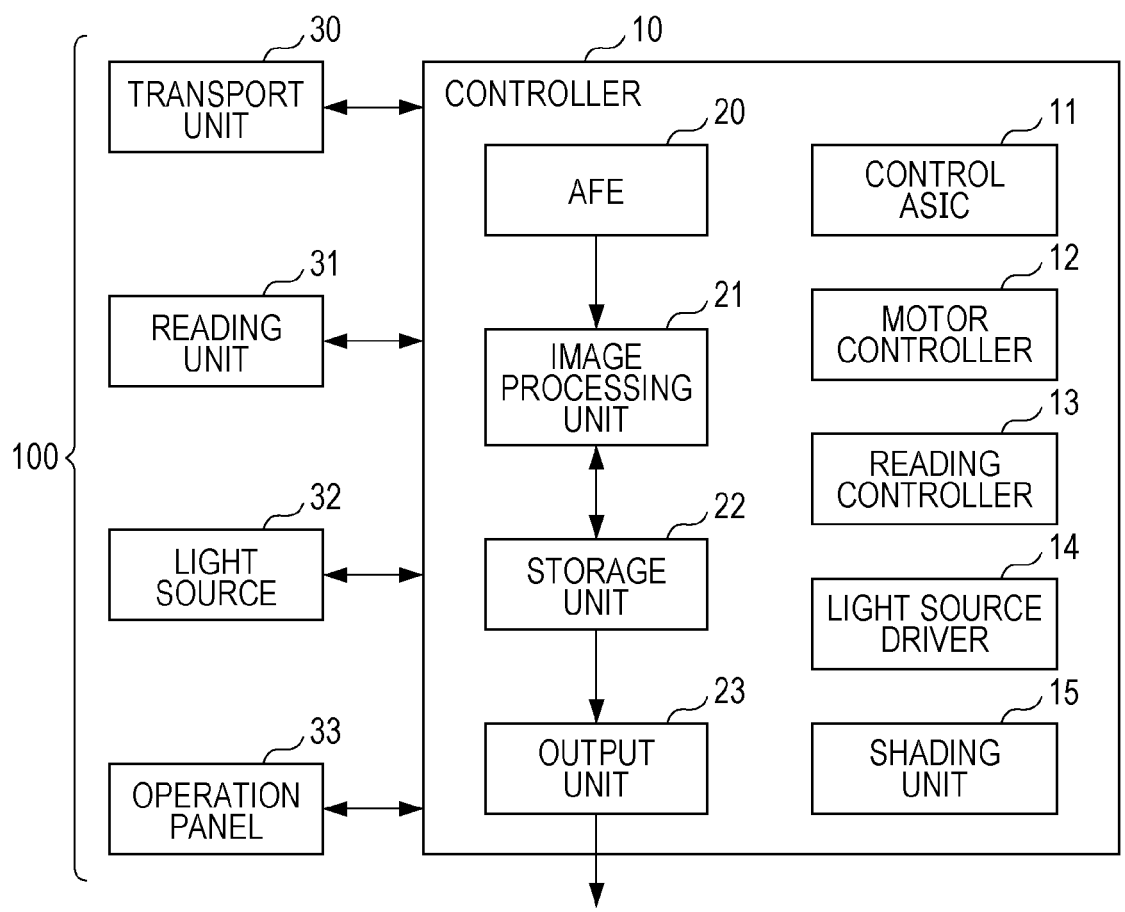
FIG. 1 is a block diagram schematically showing the configuration of an image reading apparatus.
Figure 2:
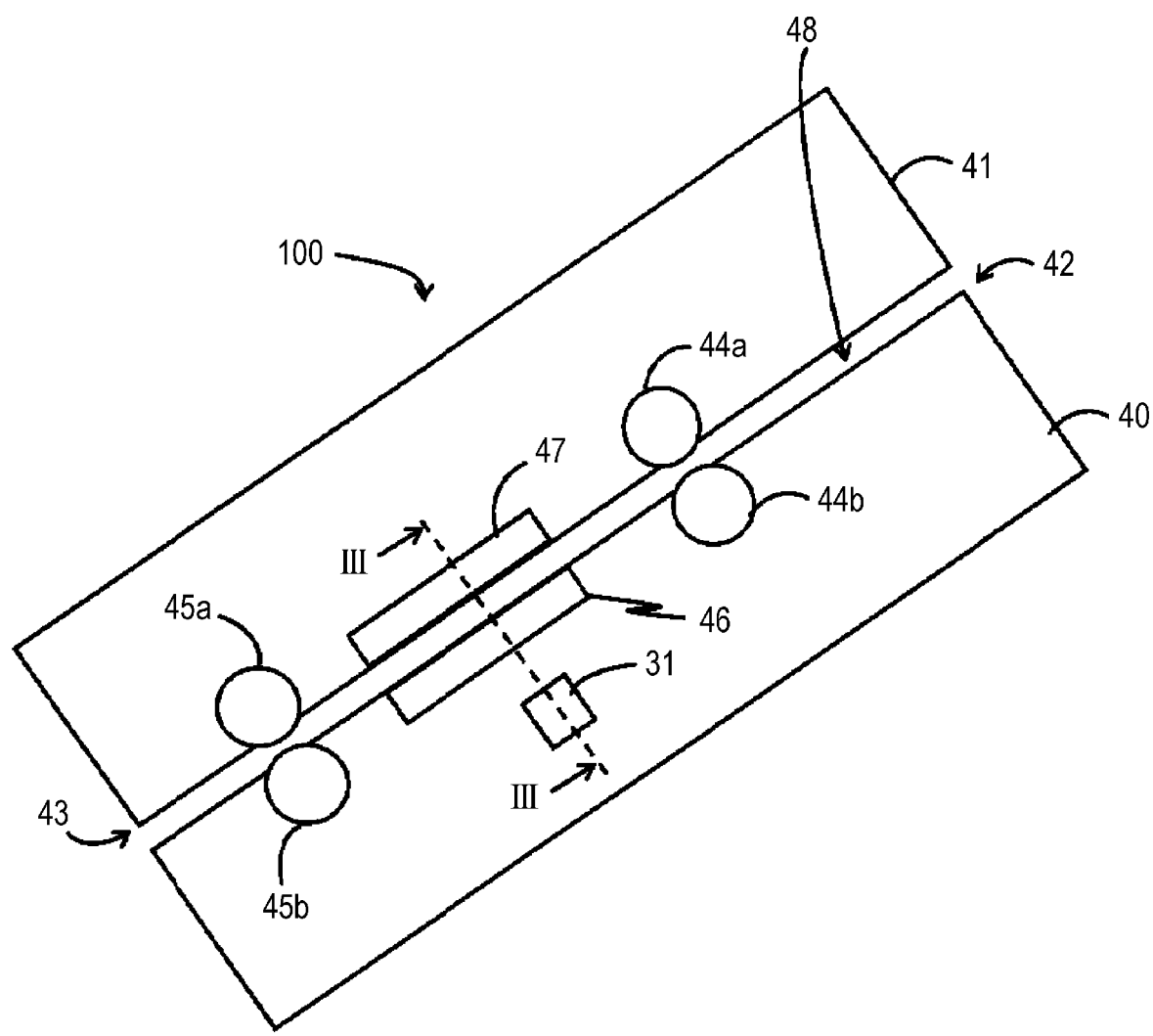
FIG. 2 is a schematic diagram showing a mechanical structure of the image reading apparatus including a transport path.

FIG. 1 schematically shows the configuration of an image reading apparatus 100 according to the present embodiment. FIG. 2 schematically shows the mechanical structure of the image reading apparatus 100 including a transport path 48. The image reading apparatus 100 is a scanner configured to read a document. The image reading apparatus 100 includes a transport unit 30 that transports a document, a reading unit 31 that performs reading, a light source 32 that irradiates an object to be read such as a document, an operation panel 33, and a controller 10 that controls the transport unit 30, the reading unit 31, the light source 32, and the operation panel 33. The operation panel 33 includes a display unit that displays visual information, an operation receiving unit that receives an operation from a user, and the like. Examples of the operation receiving unit include a touch panel implemented in the display unit, a physical button, and the like. The image reading apparatus 100 may be a multifunction machine having a plurality of functions such as a printer in addition to the function as a scanner.

The transport unit 30 is a mechanism configured to transport a plurality of documents in succession from upstream to downstream of transport, and includes, for example, a roller that transports the documents, a motor that rotates the roller, and the like. Transporting a plurality of documents in succession means repeating transport of documents one by one. The document transported by the transport unit 30 is read by the reading unit 31. Therefore, the image reading apparatus 100 corresponds to a sheet feed scanner. The transport unit 30 may be referred to as an auto document feeder (ADF).

The light source 32 is, for example, a light emitting diode (LED). The reading unit 31 has an image sensor. The image sensor receives reflected light and the like from a document of light emitted by the light source 32, stores an electric charge according to the amount of light received, and transmits the electric charge to the controller 10 as image data. The image sensor is composed of a plurality of sensor chips arranged in the main scanning direction. The main scanning direction is a direction that intersects a direction in which the document is transported by the transport unit 30. The term "intersect" as used herein means orthogonality, but may mean not only strictly orthogonality, but also orthogonality with an error of a certain degree which is caused due to component mounting accuracy or the like. That is, the reading unit 31 is a line image sensor having a length capable of covering the width of the document in the main scanning direction. The main scanning direction is also referred to as the longitudinal direction of the image sensor. The transport direction is also called a sub-scanning direction. In FIG. 2, the main scanning direction is a direction perpendicular to the plane of the paper of FIG. 2.

Respective sensor chips constituting the reading unit 31 have the configuration same as that of a contact image sensor (CIS) or a charge coupled device (CCD) image sensor. That is, each sensor chip includes a photoelectric conversion element, a shift gate, and a shift register. The electric charge stored in the photoelectric conversion element is transferred to the shift register by opening the shift gate, and the electric charge is output while being sequentially moved by the shift register. The electric charge of each photoelectric conversion element arranged in the main scanning direction corresponds to the value (reading value) of each pixel constituting the image data read by the reading operation of the reading unit 31.

The opening of the shift gate (electric charge transfer) is performed in response to a control signal from the controller 10. The electric charge transferred to the shift register is converted to analog data and output, from an output unit at the end of the shift register, to an analog front end (AFE) 20 of the controller 10.

The controller 10 includes, for example, a CPU that performs main control, a ROM that stores programs and the like, a RAM that temporarily stores data and the like as a main memory, an application specific integrated circuit (ASIC) that is designed to exclusively perform various types of processing, and other circuit components. The controller 10 may be a system-on-a-chip (SoC) controller. The controller 10 includes, for example, the AFE 20, an image processing unit 21, a storage unit 22, and an output unit 23. The controller 10 includes a motor controller 11, a reading controller 12, and a light source drive unit 13.

The motor controller 11 causes the transport unit 30 to transport a document, for example, by controlling a motor (not shown) of the transport unit 30 by PID control. The reading controller 12 controls reading by the reading unit 31. That is, the reading controller 12 outputs a trigger as the control signal to the reading unit 31, and controls transfer of the electric charge stored in the photoelectric conversion element. The light source drive unit 13 controls turning on and off of the light source 32 by controlling energization of the light source 32.

The AFE 20 converts analog data output from the reading unit 31 into digital data. The image processing unit 21 performs shading correction and the like on the digital data output from the AFE 20 to output them. However, sharing of roles between the AFE 20 and the image processing unit 21 need not be understood in a limited manner as described above. The AFE 20 and the image processing unit 21 may be collectively referred to as an AFE, or conversely, the AFE 20 and the image processing unit 21 may be collectively referred to as an image processing unit. The storage unit 22 also functions as a buffer for temporarily storing digital data before and after processing by the image processing unit 21. The storage unit 22 transmits the digital data processed by the image processing unit 21 to the output unit 23.

The output unit 23 transmits the digital data input from the storage unit 22 to an external information processing apparatus, for example, a host such as a personal computer (not shown). The function of the output unit 23 is implemented by, for example, an interface that performs a network connection or a Universal Serial Bus (USB) connection. When the image reading apparatus 100 is a multifunction machine as described above, the output unit 23 may output data to a printer unit that is configured to perform printing based on image data that the image reading apparatus 100 has.

As shown in FIG. 2, the image reading apparatus 100 includes a main body 40 and a lid 41 that covers a predetermined surface of the main body 40. The lid 41 can be opened and closed with respect to the main body 40. The document transport path 48 is secured between the main body 40 and the lid 41. That is, the transport unit 30 takes the document into the housing of the image reading apparatus 100 from a supply port 42 upstream of the transport path 48. The transport unit 30 transports a document taken in from the supply port 42 in the transport path 48 by rotating rollers 44a, 44b, 45a, 45b, and the like, and discharges the document from a discharge port 43 downstream of the transport path 48 to the outside. Although the illustration is omitted, a paper feed tray capable of placing a bundle of documents before reading is disposed in the vicinity of the supply port 42, or a paper discharge tray for accumulating the document after reading is disposed in the vicinity of the discharge port 43.

The predetermined surface of the main body 40, that is, part of the surface facing the lid 41, is constituted by a transparent member 46. While the transparent member 46 is often made of glass, it may be a transparent material other than glass. As shown in FIG. 2, the reading unit 31 is housed inside the main body 40. Although omitted in FIG. 2, the light source 32 and the controller 10 is also housed in the main body 40. A background plate 47 is disposed on the lid 41 at a position facing the transparent member 46. The background plate 47 is, for example, a white or gray plate member. The background plate 47 may be an independent member which is attached to the lid 41 but is separated from the lid 41, or may be part of the lid 41.

When the document transported on the transport path 48 passes a position corresponding to the transparent member 46, the document is irradiated by the light source 32, and the reflected light from the document enters the reading unit 31 through the transparent member 46. As is known, the reading unit 31 appropriately includes an optical system such as a lens or a mirror in addition to the image sensor, and light incident on the reading unit 31 through the transparent member 46 is received by the image sensor via the optical system. In a state where no document is present between the transparent member 46 and the background plate 47, the background plate 47 is irradiated by the light source 32, and the reflected light from the background plate 47 enters the reading unit 31.

In FIG. 2, the pair of rollers 44*a* and 44*b* facing each other across the transport path 48 and the pair of rollers 45*a* and 45*b* facing each other across the transport path 48 are illustrated as part of the rollers constituting the transport unit 30. The roller 44*a* is disposed on the lid 41, and the roller 44*b* is disposed on the main body 40. The roller 45*a* is disposed on the lid 41, and the roller 45*b* is disposed on the main body 40. The rollers 44*a* and 44*b* are located upstream of the background plate 47. The rollers 44*a* and 44*b* may be referred to as a paper feed roller or the like. The rollers 45*a* and 45*b* are located downstream of the background plate 47. The rollers 45*a* and 45*b* may be referred to as a discharge roller or the like.

Figure 3:
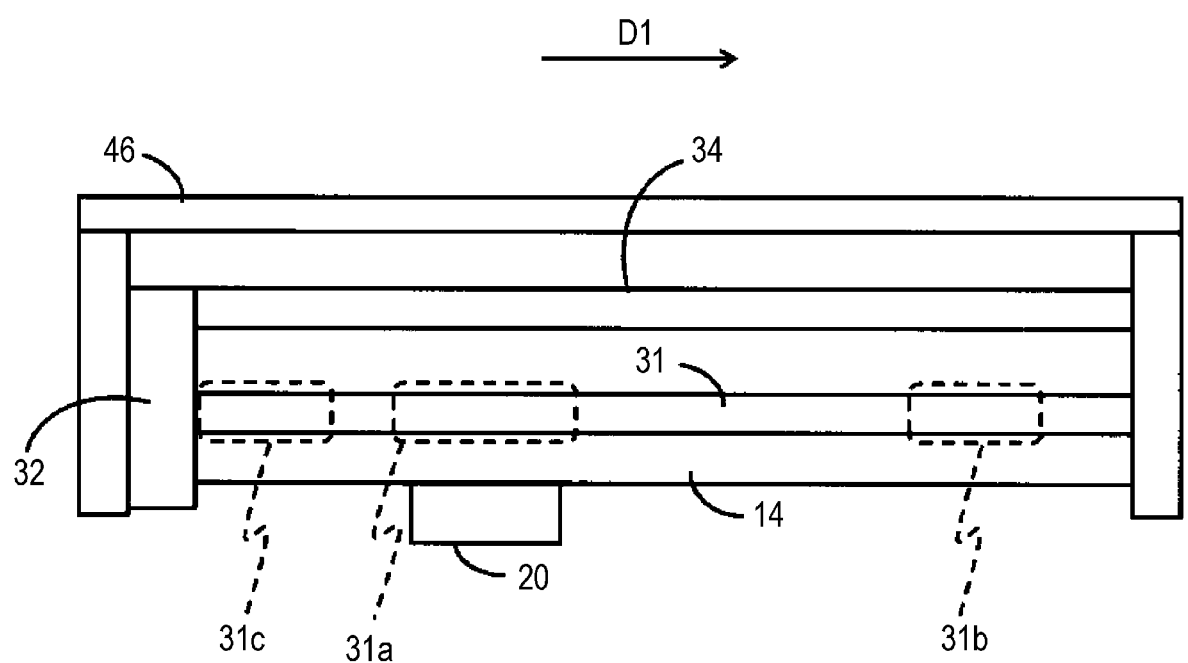
FIG. 3 is a diagram showing a partial configuration in the main body.

FIG. 3 illustrates a partial configuration in the main body 40. FIG. 3 is a cross-sectional view taken along line III-III of FIG. 2. In FIG. 3, in the light of ease of seeing, the hatching indicating the cross section of the member is omitted. A reference sign D1 indicates a main scanning direction D1. Reference sign 14 denotes a substrate 14 on which at least part of the configuration within a main body 10 is mounted. In the example of FIG. 3, the reading unit 31 is mounted on the substrate 14. As described above, the reading unit 31 includes the image sensor including a plurality of photoelectric conversion elements arranged in the main scanning direction D1. The AFE 20 as part of the controller 10 is disposed at a position very close to the substrate 14. That is, in order to make the transfer of the output of the reading unit 31 to the AFE 20 as fast as possible, the wiring between the reading unit 31 and the AFE 20 is shortened, and the reading unit 31 and the AFE 20 are arranged at close positions to each other.

According to FIG. 3, in the main body 40, an LED as the light source 32 is disposed in the vicinity of one end of both ends in the main scanning direction D1, and a light guide plate 34 for diffusing the light emitted from the light source 32 is disposed between the transparent member 46 and the reading unit 31.

The AFE 20 is a component that easily generates heat among various circuit components of the controller 10 during continuous scanning. That is, the AFE 20 corresponds to a specific example of a given heat generation source. For this reason, among the plurality of photoelectric conversion elements constituting the reading unit 31, some photoelectric conversion elements that are relatively close to the AFE 20 undergo temperature influence by the AFE 20. The fact that the photoelectric conversion elements undergo temperature influence by AFE20 means that the output characteristics vary under not only the influence of the ambient temperature of the reading unit 31 but also the influence of the temperature of the AFE 20 as a heat generation source. A first element range 31*a* indicated by a broken line in FIG. 3 indicates the position of a photoelectric conversion element group that undergoes temperature influence by the AFE 20.

A second element range 31*b* indicated by a broken line in FIG. 3 indicates the position of some of the element groups that are sufficiently away from the AFE 20 among the plurality of photoelectric conversion elements that constitute the reading unit 31. The photoelectric conversion element group included in the second element range 31*b* does not undergo temperature influence by the AFE 20 but is affected by the ambient temperature of the reading unit 31.

A third element range 31*c* indicated by a broken line in FIG. 3 indicates the position of some of the element groups close to the light source 32 among the plurality of photoelectric conversion elements constituting the reading unit 31. The photoelectric conversion element group included in the third element range 31*c* is a specific example of an element group having a specific positional relationship with the light source 32. The photoelectric conversion element group included in the third element range 31*c* is the same as the photoelectric conversion element group included in the second element range 31*b* in that it does not undergo temperature influence by the AFE 20, but is affected by the ambient temperature of the reading unit 31. However, since the photoelectric conversion element group included in the third element range 31*c* is close to the light source 32, it is further affected by variation of the light source 32 due to continuous scanning.

Specifically, the temperature around the reading unit 31 and the light source 32 rises during continuous scanning, and along with this, the light source 32 and various peripheral components coupled to the light source 32 are subject to variation such as distortion and displacement according to the difference in heat shrinkage rates of respective materials. The output characteristics of the photoelectric conversion element group included in the third element range 31*c* are likely to fluctuate due to such distortion and displacement.

2. Image Reading Process

Figure 4:
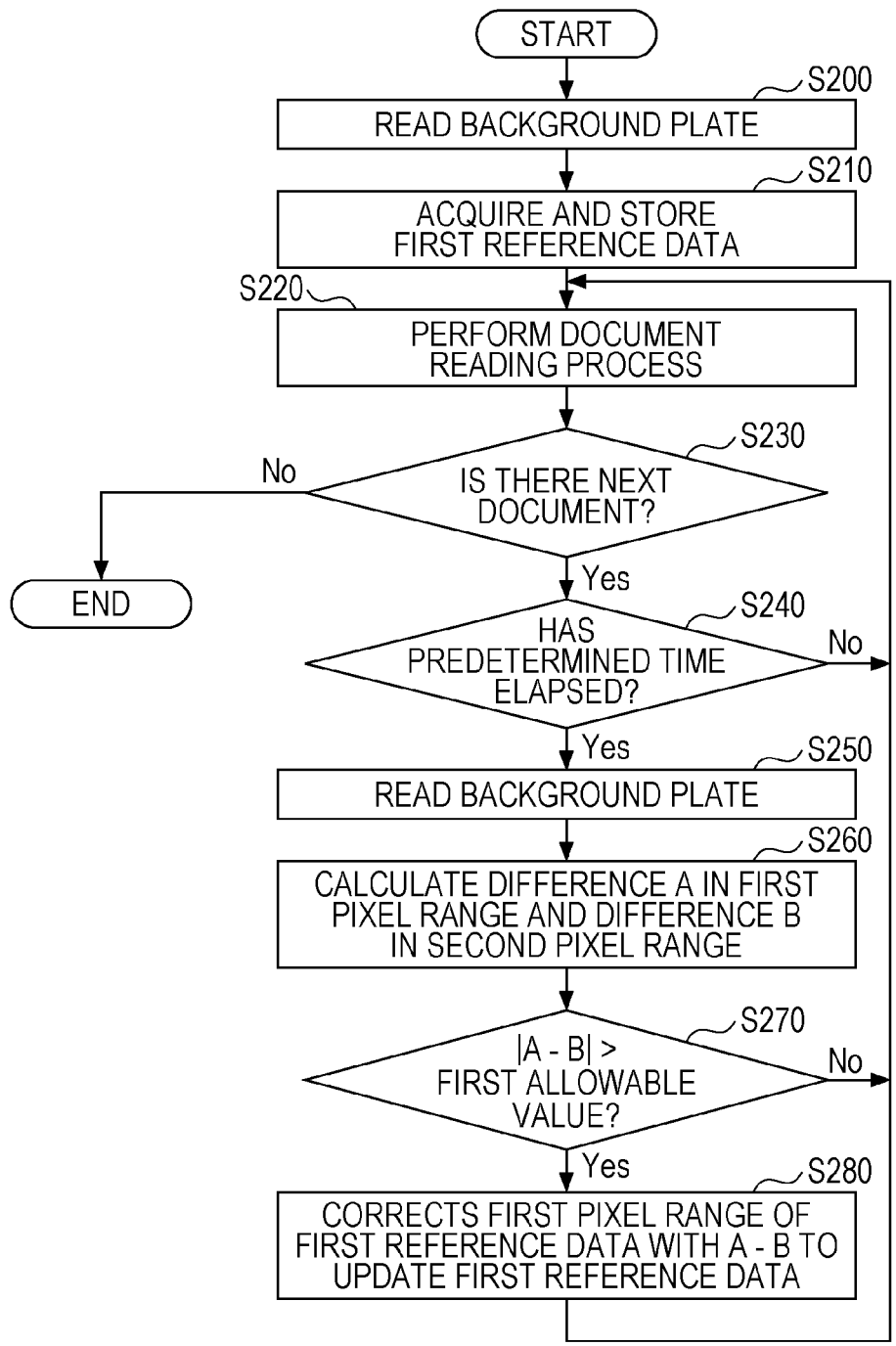
FIG. 4 is a flowchart showing an image reading process according to a first embodiment.

FIG. 4 is a flowchart showing an image reading process performed by the controller 10. The flowchart discloses an image reading method. When accepting a scan start instruction via the operation panel 33, the controller 10 starts the image reading process.

In step S200, the controller 10 reads the background plate 47. The controller 10 controls the light source 32 and the reading unit 31 to perform light-on reading of the background plate 47 and light-off reading of the background plate 47. That is, the controller 10 causes the reading unit 31 to read the background plate 47 in a state in which the light source 32 is turned on, and causes the reading unit 31 to read the background plate 47 in a state in which the light source 32 is turned off. Of course, in step S200, the transport of the document by the transport unit 30 is not started.

In step S210, the controller 10 acquires "first reference data" serving as a reference value for shading correction, and stores it in a given memory, for example, the storage unit 22. The first reference data refers to the black level reference value and the white level reference value.

Here, the shading correction will be briefly described. The black level and the white level in the output of the reading unit 31 can vary depending on the output characteristics of the photoelectric conversion elements constituting the reading unit 31. In other words, the output characteristics of the photoelectric conversion element vary depending on manufacturing errors, a change with time, the ambient temperature, and the like, and the black level and the white level vary according to this variation. In the shading correction, when the reading value of the document read by the reading unit 31 represents the black level reference value set for the shading correction, the reading value is converted to a minimum value of the digital output, and when the reading value of the document read by the reading unit 31 represents the white level reference value set for the shading correction, the reading value is converted to a maximum value of the digital output. The minimum value of the digital output means that, for example, the gradation value=0 when digital data is expressed by 256 gradations of 0 to 255. The maximum value of the digital output means that the gradation value=255.

The image processing unit 21 can perform shading correction, for example, by the following equation (1) with respect to the reading value for each pixel constituting the image data of the document.

$$y'=255(y-Lk1)/(Lw1-Lk1) \tag{1}$$

where y is a reading value before the shading correction for a pixel subject to shading correction, y' is a reading value after the shading correction of the pixel, Lk1 is a black level reference value corresponding to the pixel position of the pixel, and Lw1 is a white level reference value corresponding to the pixel position of the pixel.

The controller 10 acquires and stores, as a black level reference value, the image data output when the reading unit 31 performs light-off reading of the background plate 47 in step S200. In the configuration in which the image reading apparatus 100 includes the white background plate 47, the controller 10 acquires and stores, as a white level reference value, the image data output when the reading unit 31 performs light-on reading of the background plate 47 in step S200. In this way, the first reference data stored in step S210 is a black level reference value and a white level reference value at the start time of document scanning.

However, in the configuration in which the image reading apparatus 100 includes the gray background plate 47, the controller 10 estimates the white level reference value at the start time of document scanning from the image data output by the reading unit 31 by the reading in step S200, and stores the value obtained by the estimation. For example, the given memory of the controller 10 includes the black level reference value at the time of shipping, the gray level reference value at the time of shipping, and the white level reference value at the time of shipping which were read by the reading unit 31 by the manufacturer before the product shipment of the image reading apparatus 100. The white level reference value at the time of shipping is image data obtained when the reading unit 31 performs light-on reading of the white background plate, and the gray level reference value at the time of shipping is image data obtained when the reading unit 31 performs light-on reading of the gray background plate. The black level reference value at the time of shipping is image data obtained when the reading unit 31 performs light-off reading of the gray background plate, for example.

The controller 10 estimates the white level reference value, at the start time of document scanning, to be stored based on image data (gray level reference value and black level reference value at the start time of document scanning) output when the reading unit 31 performs light-on reading and light-off reading of the gray background plate 47 in step S200, the pre-stored black level reference value at the time of shipping, the pre-stored gray level reference value at the time of shipping, and the pre-stored white level reference value at the time of shipping. There are various estimation methods. For example, the controller 10 estimates, that is, calculates, the white level reference value at the start time of document scanning by applying the ratio between the gray level reference value at the time of shipping and the white level reference value at the time of shipping based on the black level reference value at the time of shipping to the ratio between the gray level reference value at the start time of document scanning and the white level reference value at the start time of document scanning base on the black level reference value at the start time of document scanning.

In the configuration in which the image reading apparatus 100 includes the gray background plate 47, the controller 10 estimates the white level reference value as described above when acquiring the white level reference value as the second reference data according to the reading of the background plate 47 in step S250 described later. That is, the controller 10 estimates the white level reference value as second reference data based on the black level reference value and the gray level reference value obtained by the reading in step S250, and respective reference values at the time of shipping. In the following, description of the estimation of the white level reference value required when the background plate 47 is gray will be omitted.

In step S220, the controller 10 performs a document reading process. The document reading process is a series of processes including transporting one document by the transport unit 30, turning on the light source 32, reading the document by the reading unit 31, performing shading correction for image data output by the reading unit 31 reading the document, storing image data after shading correction in the storage unit 22 and the like. The image processing unit 21 performs shading correction using the first reference data. The first reference data used in step S220 is the black level reference value and the white level reference value at the start time of document scanning when step S220 after step S210 is processed for the first time. When step S220 is processed after updating the first reference data described later, the black level reference value and the white level reference value after the update are used as the first reference data.

In step S230, the controller 10 determines whether there is a next document to be read. When the controller 10 determines that there is a next document, ("Yes" in step S230), the process proceeds to step S240, and when the controller 10 determines that there is no next document, ("No" in step S230), the flowchart of the image reading process ends. The controller 10 determines the presence or absence of the next document in response to a detection signal from a document detection sensor (not shown), for example, disposed in the vicinity of the supply port 42 or in the paper feed tray.

In step S240, the controller 10 determines whether a predetermined time has elapsed since the reading unit 31 read the background plate 47 last time. The last time reading of the background plate 47 refers to the reading of the background plate 47 in step S200 or the reading of the background plate 47 in step S250. The predetermined time is, for example, about several tens of seconds. When the controller 10 determines that the predetermined time has elapsed, ("Yes" in step S240), the process proceeds to step S250, and when the controller 10 determines that the predetermined time has not elapsed ("No" in step S240), step S220 and its subsequent steps are executed again.

In step S250, the controller 10 reads the background plate 47. That is, as in step S200, the controller 10 controls the light source 32 and the reading unit 31 to perform light-on reading of the background plate 47 and light-off reading of the background plate 47. The reading of the background plate 47 in step S250 is performed in a period from when the reading of the document is finished to when the reading of the next document is started. As in steps S200 and S210, the black level reference value and the white level reference value acquired by the controller 10 by reading the background plate 47 in step S250 are referred to as "second reference data". In this way, the controller 10 acquires the second reference data that is a reference value based on which the reading unit 31 performs reading by causing the reading unit 31 to read the background plate 47 during the non-document-reading period between a document-reading period and a document-reading period where the reading unit 31 reads a document during the document-reading period. As can be seen from the execution of step S250 after the determination of step S240, the controller 10 does not cause the reading unit 31 to read the background plate 47 at every rounds of the non-document-reading period, but causes the reading unit 31 to read the background plate 47 at some rounds of the non-document-reading period.

In step S260, the controller 10 calculates a difference A between the first reference data and the second reference data in a first pixel range XR1 corresponding to the first element range 31a, and a difference B between the first reference data and the second reference data in a second pixel range XR2 corresponding to the second element range 31b. The difference A corresponds to a "second difference", and the difference B corresponds to a "third difference".

Figure 5:
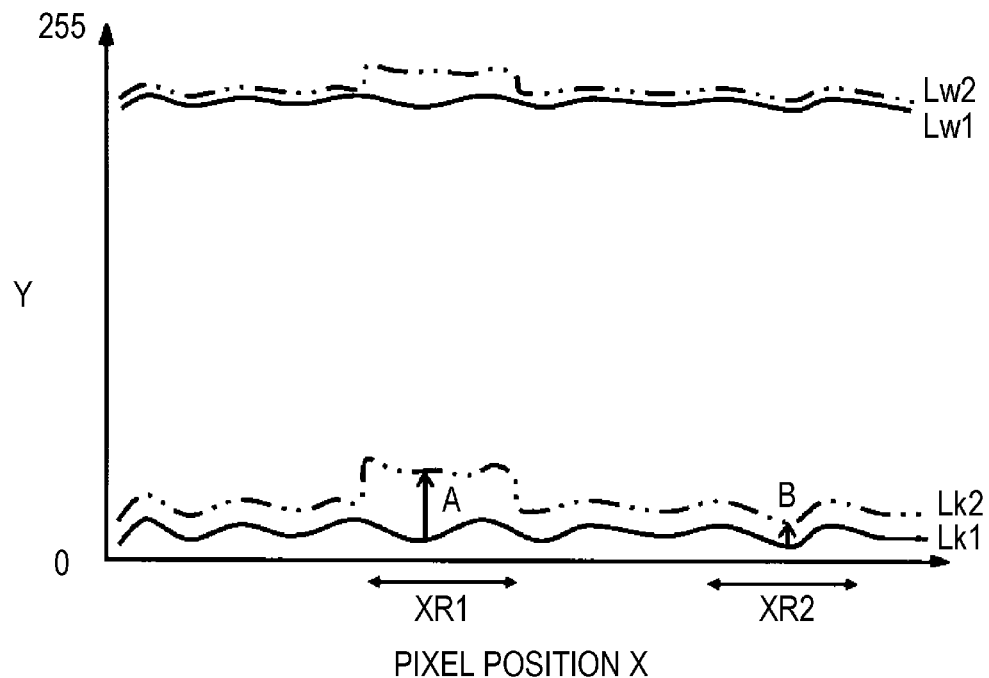
FIG. 5 is a diagram showing an example of first reference data and second reference data.
Figure 5:
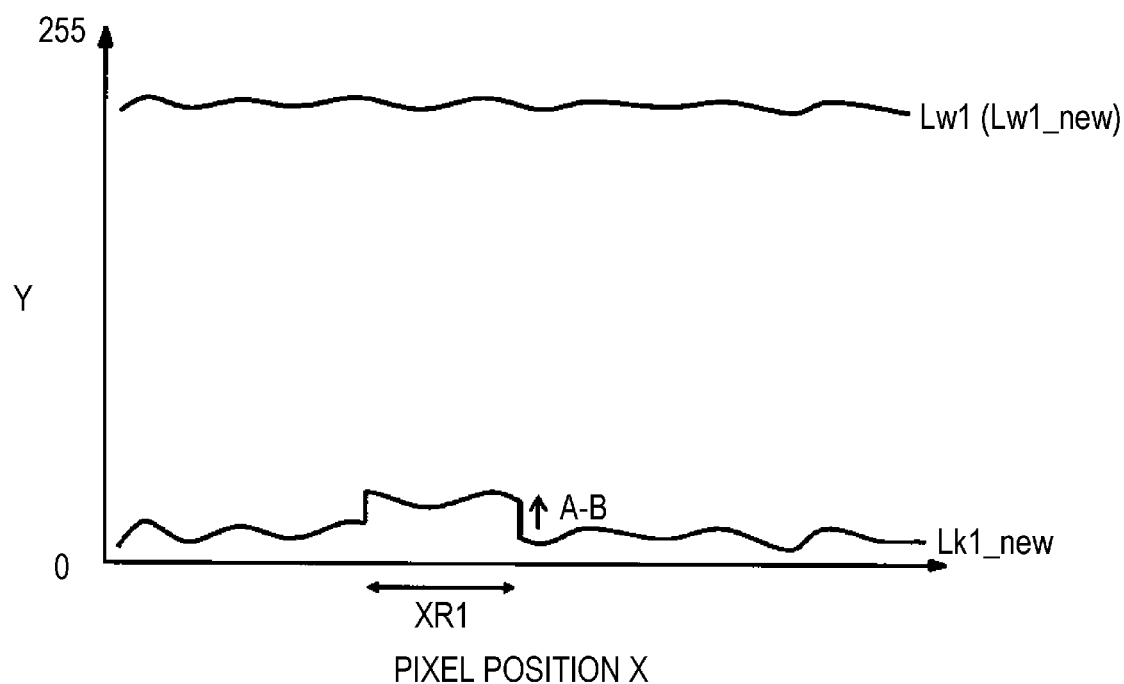

In the upper part of FIG. 5, the first reference data and the second reference data are illustrated. In FIG. 5, the horizontal axis represents the pixel position X, and the vertical axis represents the reading value Y for each pixel position X. The reading value is a value indicating brightness according to the amount of light accumulated in the photoelectric conversion element of the image sensor of the reading unit 31, and, for example, is luminance. The reading value is represented by, for example, 256 gradations from 0 to 255. The pixel position X is a position of a pixel constituting the image data, and corresponds to a position of the photoelectric conversion element in the main scanning direction D1 of the image sensor.

In the upper part of FIG. 5, the solid line graph indicates a black level reference value Lk1 and a white level reference value Lw1 as the first reference data, and the two-dot chain line graph indicates a black level reference value Lk2 and a white level reference value Lw2 as the second reference data. For example, the black level reference value Lk1 and the white level reference value Lw1 are the black level reference value and the white level reference value at the start time of document scanning. There is a difference between the first reference data and the second reference data because the environments when the reading unit 31 reads the background plate 47 are different.

The first element range 31a and the second element range 31b are determined in advance due to the structure of the image reading apparatus 100. For this reason, the first pixel range XR1 corresponding to the first element range 31a and the second pixel range XR2 corresponding to the second element range 31b are also determined in advance within the range in which the pixel position X is available. For example, the controller 10 sets, as a difference A, a value obtained by subtracting the black level reference value Lk1 from the black level reference value Lk2 in the first pixel range XR1. However, the values obtained by subtracting the black level reference value Lk1 from the black level reference value Lk2 are different between respective pixel positions X. For this reason, the controller 10 calculates values obtained by subtracting the black level reference value Lk1 from the black level reference value Lk2 for respective pixel positions X in the first pixel range XR1, and set, as the difference A, the average value of the values calculated for respective pixel positions X in the first pixel range XR1.

Similarly, the controller 10 sets, as a difference B, a value obtained by subtracting the black level reference value Lk1 from the black level reference value Lk2 in the second pixel range XR2. Also in this case, the values obtained by subtracting the black level reference value Lk1 from the black level reference value Lk2 are different between respective pixel positions X. For this reason, the controller 10 calculates values obtained by subtracting the black level reference value Lk1 from the black level reference value Lk2 for respective pixel positions X in the second pixel range XR2, and set, as the difference B, the average value of the values calculated for respective pixel positions X in the second pixel range XR2.

In step S270, the controller 10 calculates the difference between the difference A and the difference B, and determines whether the absolute value of the calculated difference exceeds a predetermined first allowable value. The difference between the difference A and the difference B corresponds to the "first difference". When the first difference (absolute value) exceeds the first allowable value ("Yes" in step S270), the controller 10 advances the process to step S280, and when the first difference (absolute value) does not exceed the first allowable value ("No" in step S270), step S220 and its subsequent steps are executed again.

It can be said that the first difference substantially represents the difference between the value of the first pixel range XR1 and the value of the second pixel range XR2 with respect to the second reference data. For this reason, the controller 10 may calculate the first difference more simply. For example, in steps S260 and S270, instead of the above processing, a value obtained by subtracting the average value of the black level reference values Lk2 in the second pixel range XR2 from the average value of the black level reference values Lk2 in the first pixel range XR1 is calculated as the first difference, and it may be determined whether the absolute value of the first difference exceeds the first allowable value.

In step S280, the controller 10 corrects the value of the first pixel range XR1 of the first reference data based on the first difference to update the first reference data. As mentioned above, when the first difference is the difference between the difference A and the difference B, the controller 10 uniformly corrects a value at each pixel position X in the first pixel range XR1 in the black level reference value Lk1 based on the difference between the difference A and the difference B. In this case, the controller 10 uniformly adds the difference A—the difference B to a value at each pixel position X in the first pixel range XR1 in the black level reference value Lk1.

In the lower part of FIG. 5, the black level reference value Lk1 and the white level reference value Lw1, which are the first reference data updated by the correction in step S280, are exemplified as the black level reference value Lk1_new and the white level reference value Lw1_new, respectively. In step S220 and its subsequent steps executed through step S280, such black level reference value Lk1_new and white level reference value Lw1_new are used as the black level reference value and the white level reference value of the first reference data, respectively. That is, every time step S280 is executed, the first reference data is updated.

Since the first element range 31a of the reading unit 31 undergoes temperature influence by the AFE 20 as a heat generation source, the output of the photoelectric conversion element belonging to the first element range 31a is likely to vary, in particular, in the black level, compared with that of the photoelectric conversion element belonging to the second element range 31b, which does not undergo temperature influence by the AFE 20. For this reason, as in the embodiment, by correcting the black level reference value in the first pixel range XR1 of the first reference data based on the first difference when the first difference exceeds the first allowable value, the first reference data can be updated so as to be appropriate to correct the black level variation in the first element range 31a by the shading correction.

In the example of FIG. 5, the white level reference value Lw1 of the first reference data is corrected and does not vary even after step S280. However, in step S280, the controller 10 may correct a value at each pixel position X in the first pixel range XR1 based on the difference between the difference A and the difference B with respect to the white level reference value Lw1.

3. Second Embodiment

Figure 6:
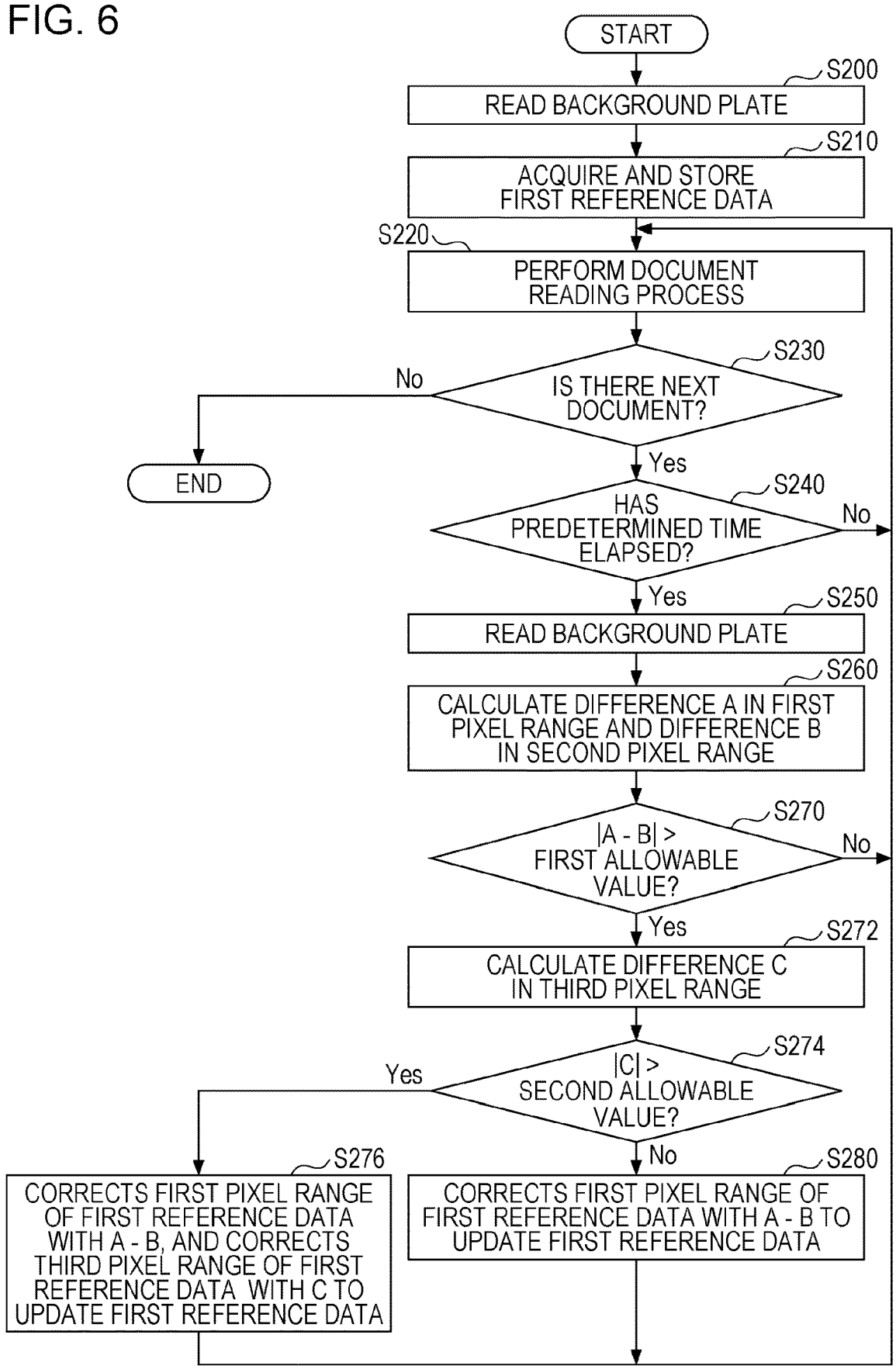
FIG. 6 is a flowchart showing an image reading process according to a second embodiment.

The contents described so far are referred to as the first embodiment for convenience, and the second embodiment will be described next. The second embodiment will be described with respect to the point which is different from that of the first embodiment. FIG. 6 is a flowchart showing an image reading process according to the second embodiment. FIG. 6 differs from FIG. 4 of the first embodiment in that steps S272, S274, and S276 are included after the determination of "Yes" in step S270.

In step S272, the controller 10 calculates a difference C between the first reference data and the second reference data in a third pixel range XR3 corresponding to the third element range 31c. The difference C corresponds to a "fourth difference".

Figure 7:
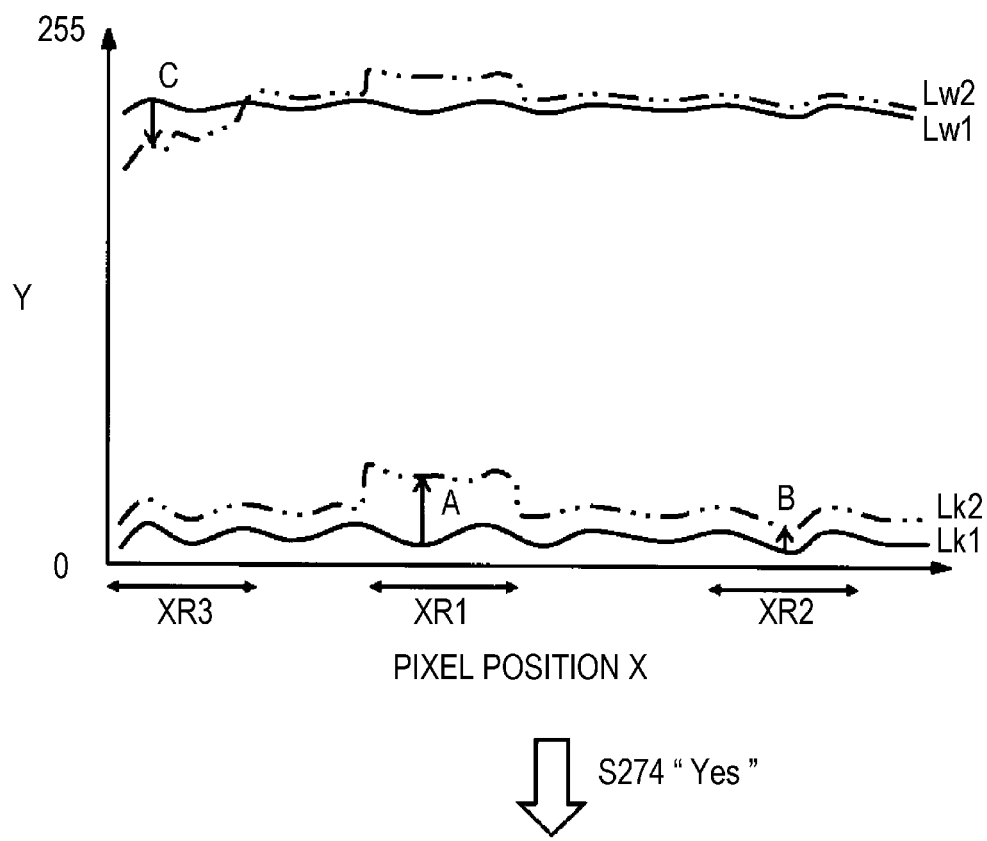
FIG. 7 is a view showing another example of the first reference data and the second reference data.
Figure 7:
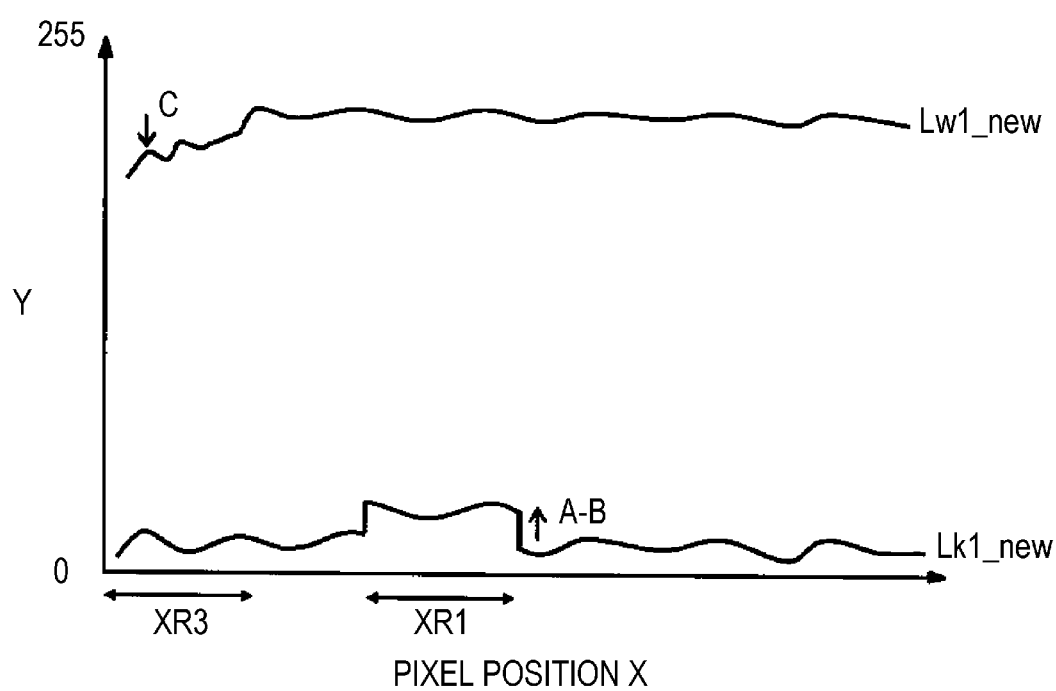

In the upper part of FIG. 7, the first reference data and the second reference data are illustrated. The way of understanding FIG. 7 is the same as the way of understanding FIG. 5. The third element range 31c is determined in advance due to the structure of the image reading apparatus 100. For this reason, the third pixel range XR3 corresponding to the third element range 31c is also determined in advance within the range that the pixel position X is available. For example, the controller 10 sets, as a difference C, a value obtained by subtracting the white level reference value Lw1 from the white level reference value Lw2 in the third pixel range XR3. The values obtained by subtracting the white level reference value Lw1 from the white level reference value Lw2 are different between respective pixel positions X. For this reason, the controller 10 calculates values obtained by subtracting the white level reference value Lw1 from the white level reference value Lw2 for respective pixel positions X in the third pixel range XR3, and set, as the difference C, the average value of the values calculated for respective pixel positions X in the third pixel range XR3.

In step S274, the controller 10 determines whether the fourth difference, that is, the absolute value of the difference C exceeds a predetermined second allowable value. When the fourth difference (absolute value) exceeds the second allowable value ("Yes" in step S274), the controller 10 advances the process to step S276, and when the fourth difference (absolute value) does not exceed the second allowable value ("No" in step S274), the controller 10 advances the process to step S280. That is, the determination of "No" in step S274 in the second embodiment leads to the same result as the determination of "Yes" in step S270 in the first embodiment.

In step S276, controller 10 corrects the value at the first pixel range XR1 of the first reference data based on the first difference as in step S280, and furthermore, corrects the value of the third pixel range XR3 of the first reference data based on the fourth difference to update the first reference data. In this case, the controller 10 adds the difference C=the white level reference value Lw2—the white level reference value Lw1 for each pixel position X to the value at each pixel position X in the third pixel range XR3 in the white level reference value Lw1.

In the lower part of FIG. 7, the black level reference value Lk1 and the white level reference value Lw1, which are the first reference data updated by the correction in step S276, are exemplified as the black level reference value Lk1_new and the white level reference value Lw1_new, respectively. The black level reference value Lk1_new shown in the lower part of FIG. 5 and the black level reference value Lk1_new shown in the lower part of FIG. 7 are the same data. According to the example of FIG. 7, since the white level reference value Lw2—the white level reference value Lw1 in the third pixel range XR3 is a negative value, by adding the negative value to the value at each pixel position X in the third pixel range XR3 of the white level reference value Lw1, the value at each pixel position X in the third pixel range XR3 of the white level reference value Lw1 is corrected to a lower value. In step S220 and its subsequent steps executed through step S276, the black level reference value Lk1_new and the white level reference value Lw1_new as exemplified in the lower part of FIG. 7 are used as the black level reference value and the white level reference value of the first reference data. That is, the first reference data is updated every time step S276 or step S280 is executed.

The third element range 31c of the reading unit 31 is affected by distortion and displacement of the light source 32 and the like due to a change in the ambient temperature. For this reason, the output of the photoelectric conversion element belonging to the third element range 31c, which has a different mode from that of the photoelectric conversion element of the first element range 31a and the second element range 31b, is likely to vary in the white level, in particular. For this reason, as in the second embodiment, by correcting the white level reference value in the third pixel range XR3 of the first reference data based on the fourth difference when the fourth difference exceeds the second allowable value, the first reference data can be updated so as to be appropriate to correct variation in the white level in the third element range 31c by the shading correction.

4. Summary

Thus, according to this embodiment, the image reading apparatus 100 includes a transport unit 30 configured to consecutively transport a plurality of documents, a light source 32 that irradiates the documents transported by the transport unit 30, a reading unit 31 having a plurality of photoelectric conversion elements arranged in a direction (main scanning direction D1) intersecting a direction in which the document is transported by the transport unit 30 and reading the document transported by the transport unit 30, and a controller 10 that performs shading correction on image data that is a reading value of the documents read by the reading unit 31 based on first reference data indicating a reference value for the shading correction. The controller 10 acquires second reference data indicating a reading value of a background plate 47 by causing the reading unit 31 to read the background plate 47 during a non-document-reading period between a document-reading period and a document-reading period where the reading unit 31 reads a document during the document-reading period. The controller 10 calculates a first difference indicating a difference between a value in a first pixel range XR1 corresponding to an element group, among the plurality of photoelectric conversion elements, in a range under temperature influence by a given heat generation source and a value in a second pixel range XR2, that is, part of a pixel range which does not fall under the first pixel range XR1 with respect to the second reference data. When the first difference exceeds a first allowable value, the controller 10 updates the first reference data by correcting a value in the first pixel range XR1 of the first reference data based on the first difference.

According to the above configuration, the controller 10 determines whether the first reference data needs to be updated based on the value in part of the pixel range, that is, the first pixel range XR1 and the second pixel range XR2, with respect to the second reference data. For this reason, the processing burden for the determination is reduced. According to the above configuration, the update frequency of the first reference data is suppressed, and even when updated, the value in part of the pixel range, that is, the first pixel range XR1, of the first reference data is corrected. In other words, the burden of updating the first reference data is reduced, so that the waiting time between a time of reading a document and a time of reading the next document in the consecutive scanning is shortened, and the speed of consecutive scanning can be improved.

In this embodiment, when the controller 10 determines "No" in step S270, step S220 is executed without updating the first reference data. That is, when the first difference does not exceed the first allowable value, the fact is that there is little variation in brightness in the image data of the document, and in this case, it can be said that the necessity for updating the first reference data is low. Therefore, the first reference data is not updated. On the other hand, when the first difference exceeds the first allowable value, it can be said that there is a large variation in brightness in the image data of the document, and the necessity for updating the first reference data is high. For this reason, the correction which is effective for suppressing the variation, that is, the correction for the value in the first pixel range XR1 of the first reference data is performed.

According to this embodiment, the controller 10 calculates a second difference that is a difference between the first reference data and the second reference data in the first pixel range XR1 and a third difference that is a difference between the first reference data and the second reference data in the second pixel range XR2, and sets a difference between the second difference and the third difference as the first difference. According to the above configuration, the variation in the current output characteristics of the reading unit 31 based on the comparison with the first reference data between the pixel ranges XR1 and XR2 can be evaluated.

According to this embodiment, the controller 10 sets, as the second difference, an average value of differences between the first reference data and the second reference data in the first pixel range XR1, and sets, as the third difference, an average value of differences between the first reference data and the second reference data in the second pixel range XR2. According to the above configuration, the variation in the current output characteristics of the reading unit 31 based on the comparison with the first reference data between the pixel ranges XR1 and XR2 can be properly evaluated.

However, the second difference and the third difference are not limited to the average value. The controller 10 may set, as the second difference and the third difference, the maximum value, the minimum value, the median value, or the like of the difference between the first reference data and the second reference data in each of the pixel ranges XR1 and XR2 instead of the average value.

According to this embodiment, the heat generation source is the AFE 20, among a plurality of circuit components included in the controller 10, that performs analog-digital conversion on the output from the reading unit 31. According to the above configuration, based on the circumstances that the AFE20 among a plurality of circuit components is relatively likely to generate heat, the first pixel range XR1 values in which are to be corrected at the time of updating the first reference data can be determined in advance.

According to this embodiment, when the first difference exceeds the first allowable value, the controller 10 further calculates a fourth difference that is a difference between the first reference data and the second reference data in a third pixel range XR3, different from the first pixel range XR1 and the second pixel range XR2, in a pixel range corresponding to an element group having a specific positional relationship with the light source 32 among the plurality of photoelectric conversion elements. When the fourth difference exceeds the second allowable value, the controller 10 corrects a value in the first pixel range XR1 of the first reference data based on the first difference, and corrects a value in the third pixel range XR3 of the first reference data based on the fourth difference to update the first reference data. According to the above configuration, the first reference data appropriate for correcting the variation in values, in the third pixel range XR3, which are likely to vary under the influence of distortion or displacement of the light source 32 or the like due to a change in the ambient temperature can be obtained by updating.

The "element group having a specific positional relationship with the light source 32" may be a group other than that in the third element range 31c at the end portion close to the light source 32 of the reading unit 31 as shown in FIG. 3. That is, an element group, among the photoelectric conversion elements constituting the reading unit 31, in which a peculiarity in variation in output characteristics is recognized due to the positional relationship with the light source 32 falls under an "element group having a specific positional relationship with the light source 32".

According to this embodiment, an image reading method including a document reading step (step S220) of reading a document, where the document is transported by a transport unit 30 configured to consecutively transport a plurality of documents and irradiated by a light source 32, by a reading unit 31 having a plurality of photoelectric conversion elements arranged in a direction (main scanning direction D1) intersecting a direction in which the document is transported, a image correction step (step S220) of performing shading correction on image data that is a reading value of the documents based on first reference data indicating a reference value for the shading correction, a background plate reading step (step S250) of acquiring second reference data indicating a reading value of a background plate 47 by causing the reading unit 31 to read the background plate 47 during a period between the document reading step and the document reading step, a difference calculation step (steps S260 and S270) of calculating a first difference indicating a difference between a value in a first pixel range XR1 corresponding to an element group, among the plurality of photoelectric conversion elements, in a range under temperature influence by a given heat generation source and a value in a second pixel range XR2, that is, part of a pixel range which does not fall under the first pixel range XR1 with respect to the second reference data, and an update step (steps S270 and S280) of updating, when the first difference exceeds a first allowable value, the first reference data by correcting a value in the first pixel range XR1 of the first reference data based on the first difference.

What is claimed is:

1. An image reading apparatus comprising:
   a transport unit configured to consecutively transport a plurality of documents;
   a light source that irradiates the documents transported by the transport unit;
   a reading unit having a plurality of photoelectric conversion elements arranged in a direction intersecting a direction in which the document is transported by the transport unit, wherein the reading unit is configured to read the document transported by the transport unit; and
   a controller that performs shading correction on image data that is a reading value of the documents read by the reading unit based on first reference data indicating a reference value for the shading correction,
   wherein the controller
   acquires second reference data indicating a reading value of a background plate by causing the reading unit to read the background plate during a non-document-reading period between a document-reading period and a document-reading period, the reading unit reading the document during the document-reading period,
   calculates a first difference indicating a difference between a value in a first pixel range corresponding to an element group, among the plurality of photoelectric conversion elements, in a range under temperature influence by a given heat generation source and a value in a second pixel range, that is, part of a pixel range which does not fall under the first pixel range with respect to the second reference data, and
   updates, when the first difference exceeds a first allowable value, the first reference data by correcting a value in the first pixel range of the first reference data based on the first difference,
   wherein, when the first difference exceeds the first allowable value, the controller further calculates a fourth difference that is a difference between the first reference data and the second reference data in a third pixel range, different from the first pixel range and the second pixel range, in a pixel range corresponding to an element group having a specific positional relationship with the light source among the plurality of photoelectric conversion elements, and when the fourth difference exceeds the second allowable value corrects a value in the first pixel range of the first reference data based on the first difference, and corrects a value in the third pixel range of the first reference data based on the fourth difference to update the first reference data.

2. The image reading apparatus according to claim 1, wherein the controller calculates a second difference that is a difference between the first reference data and the second reference data in the first pixel range and a third difference that is a difference between the first reference data and the second reference data in the second pixel range, and sets a difference between the second difference and the third difference as the first difference.

3. The image reading apparatus according to claim 2, wherein the controller sets, as the second difference, an average value of differences between the first reference data and the second reference data in the first pixel range, and sets, as the third difference, an average value of differences between the first reference data and the second reference data in the second pixel range.

4. The image reading apparatus according to claim 1, wherein the heat generation source is an analog front end that performs analog-to-digital conversion on an output from the reading unit among a plurality of circuit components included in the controller.

5. An image reading method comprising:
   a document reading step of reading a document, the document being transported by a transport unit configured to consecutively transport a plurality of documents and irradiated by a light source by a reading unit having a plurality of photoelectric conversion elements arranged in a direction intersecting a direction in which the document is transported;
   a image correction step of performing shading correction on image data that is a reading value of the documents based on first reference data indicating a reference value for the shading correction;
   a background plate reading step of acquiring second reference data indicating a reading value of a background plate by causing the reading unit to read the background plate during a period between the document reading step and the document reading step;
   a difference calculation step of calculating a first difference indicating a difference between a value in a first pixel range corresponding to an element group, among the plurality of photoelectric conversion elements, in a range under temperature influence by a given heat generation source and a value in a second pixel range, that is, part of a pixel range which does not fall under the first pixel range with respect to the second reference data; and
   an update step of updating, when the first difference exceeds a first allowable value, the first reference data by correcting a value in the first pixel range of the first reference data based on the first difference,
   wherein, when the first difference exceeds the first allowable value, calculating a fourth difference that is a difference between the first reference data and the second reference data in a third pixel range, different from the first pixel range and the second pixel range, in a pixel range corresponding to an element group having a specific positional relationship with the light source among the plurality of photoelectric conversion elements, and
   when the fourth difference exceeds the second allowable value, correcting a value in the first pixel range of the first reference data based on the first difference, and correcting a value in the third pixel range of the first reference data based on the fourth difference to update the first reference data.

* * * * *